May 16, 1939.                 W. O. AMSLER                    2,158,669
                    METHOD OF AND APPARATUS FOR DRAWING GLASS
                    Filed May 6, 1935              2 Sheets—Sheet 1
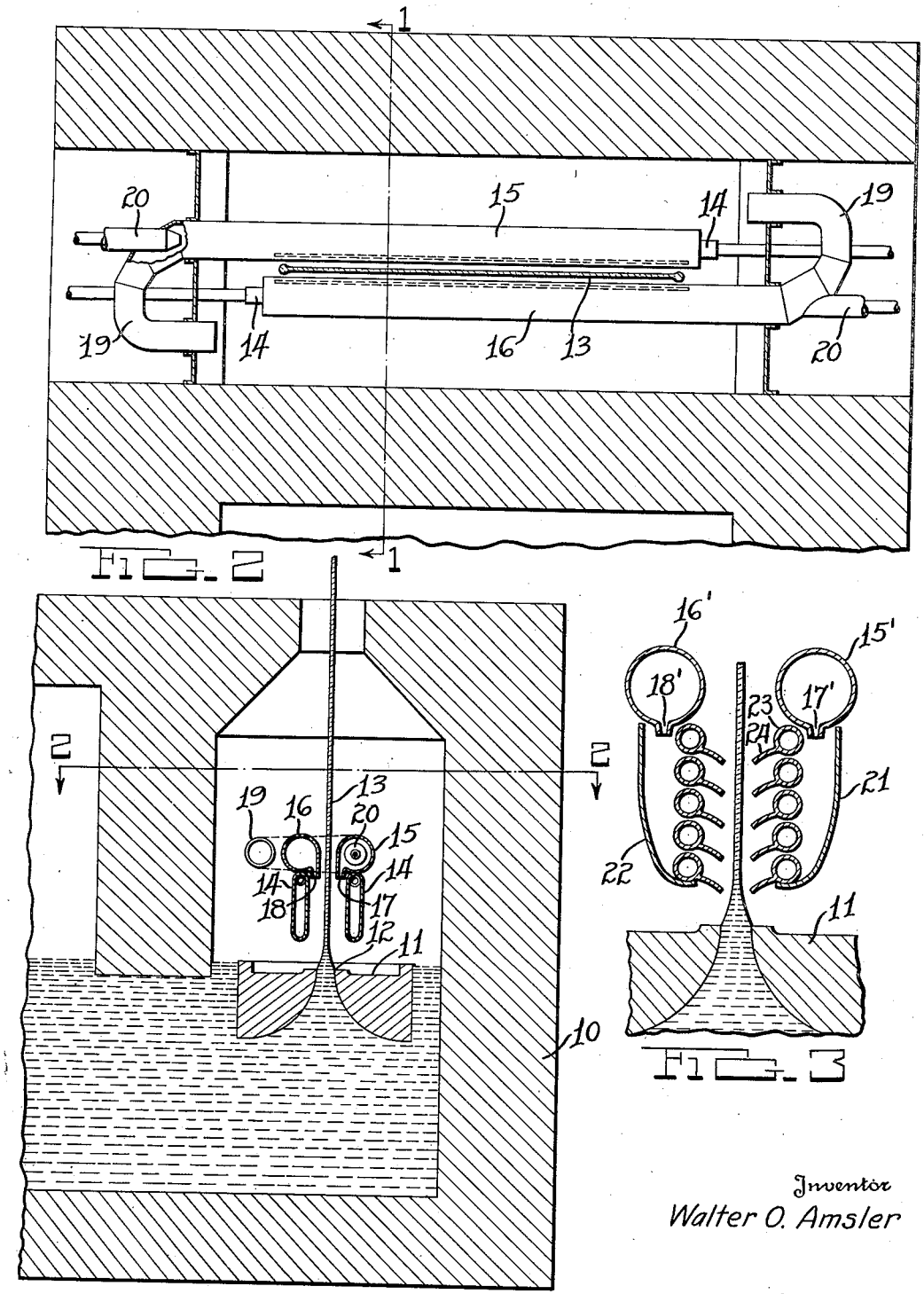
Inventor
Walter O. Amsler May 16, 1939.  W. O. AMSLER  2,158,669
METHOD OF AND APPARATUS FOR DRAWING GLASS
Filed May 6, 1935  2 Sheets-Sheet 2
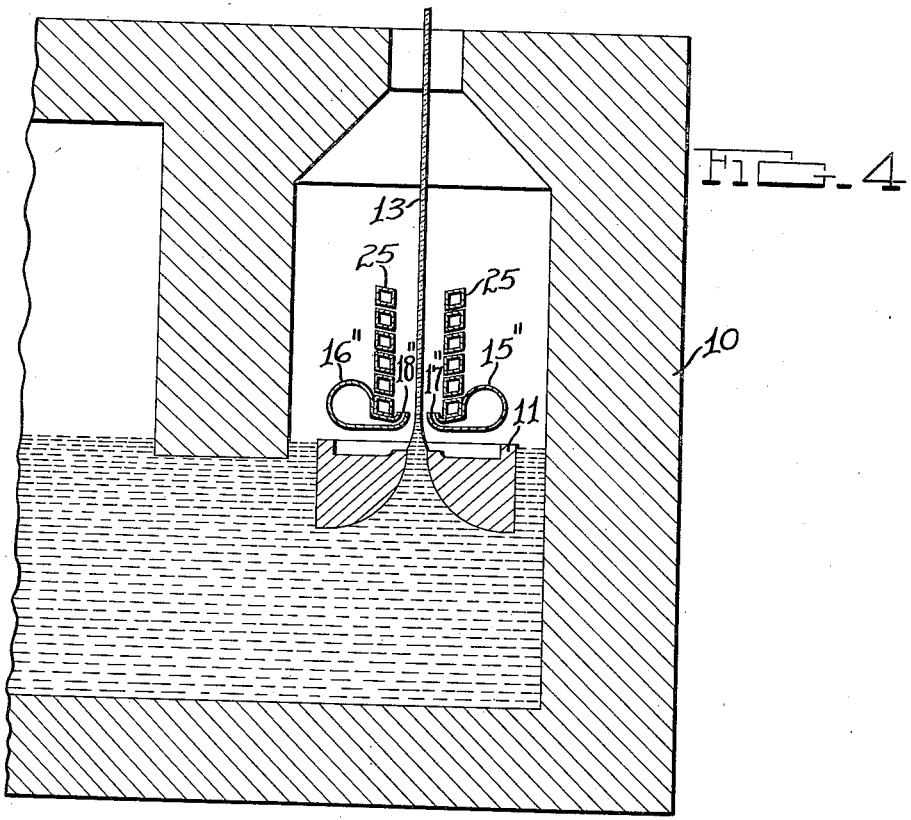
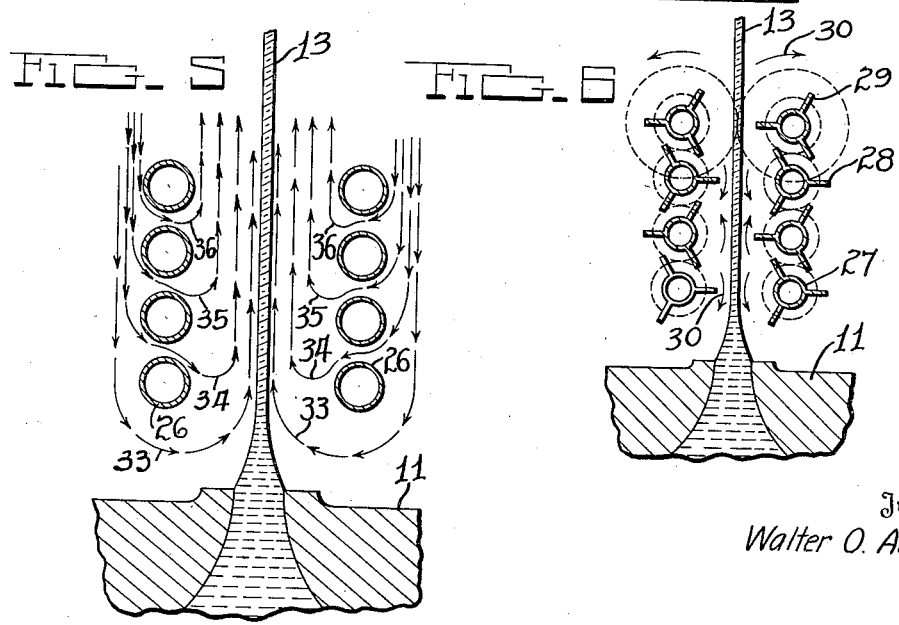
Inventor
Walter O. Amsler
By Owen & Owen
Attorneys Patented May 16, 1939

2,158,669

UNITED STATES PATENT OFFICE 2,158,669

METHOD OF AND APPARATUS FOR DRAWING GLASS

Walter O. Amsler, Toledo, Ohio, assignor to Frazier-Simplex, Inc., Wilmington, Del., a corporation of Delaware Application May 6, 1935, Serial No. 19,924

3 Claims. (Cl. 49—17)

This invention relates to a method of and apparatus for drawing glass and more particularly it relates to improvements whereby eddy currents are minimized in the immediate vicinity of the glass while it is solidifying. In general, this purpose is accomplished by dividing up the sources of gas which are heated and normally rise adjacent the glass and/or superimposing forced draft currents upon the gases in contact with the glass surface during solidification.

Various details and minor features in connection with the embodiment of this principle will be disclosed as the description proceeds.

In the accompanying drawings forming a part of this specification, Figure 1 is a vertical section through a sheet of glass as it is drawn and the adjacent apparatus, including one embodiment of the present invention, the section being taken along line 1—1 of Fig. 2. Figure 2 is a horizontal section on the line 2—2 of Fig. 1; Fig. 3 is an enlarged detail view of the glass source and gas in current control, similar to that shown in Fig. 1, but illustrating a different embodiment of the invention; Fig. 4 is a section similar to Fig. 1, but showing still another embodiment of the invention; Fig. 5 is a detail view similar to Fig. 3, but showing another embodiment of the present invention; Fig. 6 is another view similar to Fig. 3, but showing another embodiment of the invention.

In Fig. 1 there is shown the usual furnace extension or dog house 10 with the member 11 providing a slot 12 from which the sheet of glass 13 is drawn upward by any suitable means. Spaced from the opposite sides of the sheet there are shown coolers 14 in a customary arrangement. Above the coolers 14 there are shown pipes 15 and 16 having downwardly directed slits 17 and 18 opening between the sheet of glass and the adjacent coolers 14. Each pipe 15 and 16 is provided with an elbow 19, the free end of which opens into the space above the glass. A jet nozzle 20 is inserted through the bend of the elbow and in alignment with the respective pipe so that air or gas forced through jet 20 creates a current in the pipe drawing air through elbow 19 and forcing it through the respective pipe and downwardly directed slot, thereby creating a forcible downward current between the cooler and the surface of the glass.

The embodiment shown in Fig. 3 has a similar arrangement of pipes 15' and 16', but in this case the pipes 17' and 18' are directed downward between shields 21 and 22 and a series of cooling pipes 23 each provided with a lip 24.

In the various figures the same reference numerals are applied to identical parts.

In Fig. 4 another embodiment of the invention is shown in which pipes 15" and 16" have their slits 17" and 18" directed upward between the sheet of glass and a series of cooling pipes 25.

In Fig. 5 the ordinary cooler 14 is shown on one side of the glass, but on the other side there is shown a series of closely adjacent parallel cooling pipes 26. In Fig. 6 there are shown also closely adjacent parallel pipes on each side of the glass, but in this case the pipes are shown as being provided with wings 28 and means not shown is employed for rotating them in the directions indicated by arrows 30.

Having described several embodiments of the invention the operation of these embodiments will be briefly described.

In order to understand the object and operation of the present invention, it seems advantageous to describe first the difficulty which it is intended to overcome. When the usual cooling means 14 is employed without means for overcoming the tendency, there is actually a convection current downwards at the face of the cooling member and upwards adjacent the sheet. There is also an upward current in immediate contact with the glass which will be fed to some extent by gases coming down outside of the cooling member.

If these currents were uniform across the sheet, everything might be satisfactory, but when for any reason the current moves upward faster at one point than another, there is an automatic tendency to continue and accentuate this movement. The more rapidly upward moving current brings the warm air from below into contact with the sheet of glass and slows up the cooling operation. This in turn tends to form a heated side to a chimney and continue the upward draft at this point more stronger than at other points. For this reason, the current is in a state of unstable equilibrium and, of course, under those circumstances it is practically impossible to prevent inequalities in the currents across the sheet, the result being that the sheet cools more rapidly at certain points than at others and irregularities in the sheet result.

The simplest embodiment of the invention is that disclosed in Fig. 5 where the cooler is divided into closely adjacent pipes so that the layer of gases between the cooler and the glass is divided up into a series of separately admitted layers, as indicated by rows of arrows 33, 34, 35 and 36. It will be seen that if layer 33 tends to become unequal the impingement thereon of layer 34 will tend to lessen this inequality and subsequent layers 35 and 36 have similar tendencies.

In the construction shown in Fig. 1, the tendency to form "chimneys" is reduced by the forcible downward current of gases between the cooler and the glass.

This prevents the unstable condition pointed out above in connection with convection currents by overcoming any chimney forming tendencies by the forcible draft.

In the form shown in Fig. 3, some of the advantages of the form shown in Fig. 5 and the advantages shown of the form shown in Fig. 1 are combined by producing forced currents of air which have a tendency in themselves to overcome or smooth out currents formed purely by convection, and also the arrangement shown divides up these currents into layers. Obviously, the wings 24 may be employed to direct these layers downward or they might be omitted if preferred.

In the form shown in Fig. 4, there is also possible a combination of advantages from different forms since in this case the forcible currents would be substantially equal across the width of the glass and, therefore, would tend to diminish the irregularities caused by the unstable condition of convection currents. In operating such a device, as shown in Fig. 4, gases might be forced through pipes 15'' and 16'' at such a rate that there will be outward movement of gases between successive pipes 25; but obviously a slower rate of movement of gases from pipes 15'' and 16'' would permit the cool gases to enter between successive pipes 25 in thin layers. In either case, the substantial equality of the slots between the pipes across the sheet will tend to equalize the current between the sheet and the coolers throughout the width of the glass.

In the construction shown in Fig. 6, it is obvious that the gases entering the space between the coolers and the glass will not only enter in a plurality of sheets approximately uniform across the sheet of glass, but also the movement of the gas is determined to a considerable extent by the movement of vanes 29, so that there is the division of the gas into layers and also the forced draft applied to the separate layers, in this case in opposite directions at frequent intervals, so as to completely break up any tendency there might be to form localized hot spots or chimneys.

While a number of combinations have been shown, it will be readily understood that these are by way of illustration and that the broad principles of dividing the gases next the sheet into numerous layers and the overcoming of a tendency to inequality inherent in convection currents by imposing forced draft may be employed singly or combined in various other embodiments without departing from the broad idea. Accordingly, the invention is not confined to the use of the apparatus exactly as shown or described, but may be employed in various ways within the scope of the appended claims.

What I claim is:

1. A method of drawing glass which comprises drawing the glass upward from a bath of molten glass, cooling the glass and solidifying the same while it is being drawn upward and with gases in contact with the surface thereof, and dividing the gas admitted into contact with the solidifying surface into successive layers, and superimposing upon any convection currents, caused by the cooling action upon the glass, forced draft with a vertical component whereby inequalities of convection currents are minimized.

2. The method of drawing sheet glass which comprises drawing the sheet upward from a source of molten glass with gas contacting each side of the sheet where the sheet is solidifying, and cooling the same employing a forced draft having a vertical component and dividing the said gases into a plurality of layers parallel with the sheet, whereby inequalities of movement of the gas due to convection currents are minimized.

3. Apparatus for drawing sheet glass comprising a source of molten glass, means to draw a sheet vertically therefrom, coolers on each side of the sheet provided with horizontal vertically spaced slots for the passage of gas, and means to create a forced draft having a vertical component between the coolers and the sheet.

WALTER O. AMSLER.